March 10, 1959  N. F. SWANSON  2,876,609
DEFLECTOR FOR ROTARY DISC MOWER
Filed Jan. 14, 1957
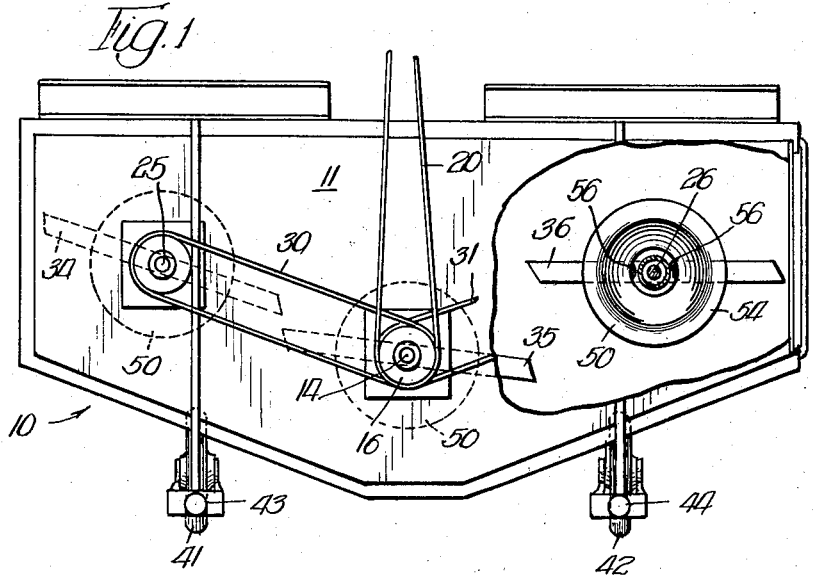
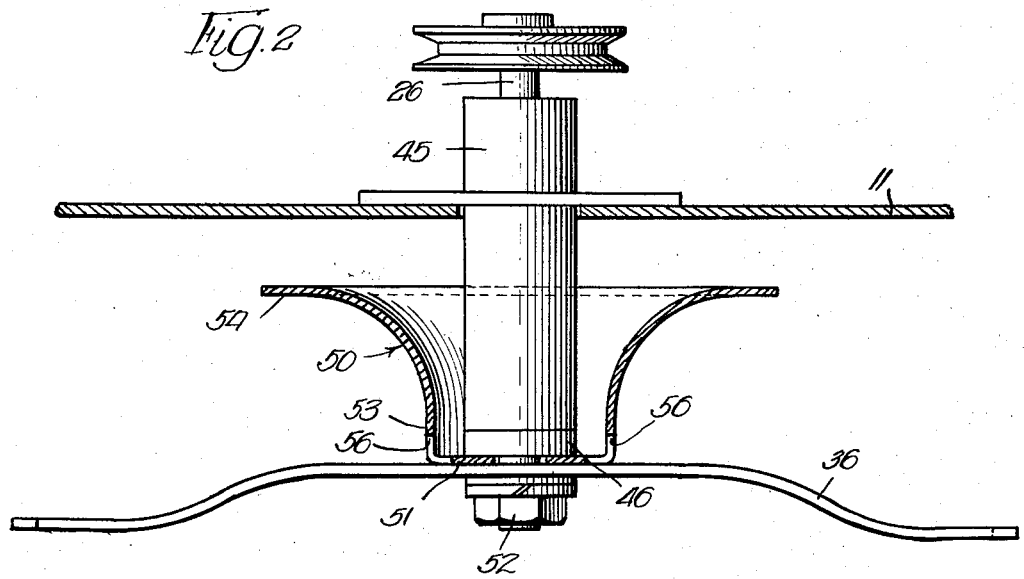
INVENTOR.
Norman F. Swanson,
BY
Byron, Hume, Groen + Clement
Attys.

United States Patent Office 2,876,609
Patented Mar. 10, 1959

2,876,609

DEFLECTOR FOR ROTARY DISC MOWER

Norman F. Swanson, Warrenville, Ill.

Application January 14, 1957, Serial No. 634,069

4 Claims. (Cl. 56—25.4)

This invention relates as indicated to a deflector guard for rotary mowers and the like.

In using rotary mowers for cutting long grass, weeds, vines, and the like, it is common for these materials to bind between the rotating shaft and the stationary housing. This causes fouling of the machine and it is often necessary to stop operation and unwind the material.

It is, therefore, an object of the invention to provide a device for keeping long grass, weeds, vines, string, wire, and the like from binding on the rotating spindle of a rotary mower.

It is a further object of the invention to provide an inexpensive deflector guard that is readily and conveniently manufactured.

Further objects and advantages of this invention will become evident as the description proceeds and from an examination of the accompanying drawing which illustrates one embodiment of the invention and in which similar numerals refer to similar parts throughout the several views.

In the drawing:

Referring to the drawings, Figure 1 is a plan view of a rotary mower having a deflector guard of the invention, partly broken away to show the deflector guard mounted on one spindle.

Figure 2 is an enlarged view with parts broken away and shown in section illustrating a deflector guard of the invention.

Referring now to the drawings, reference numeral 10 indicates generally a device of the invention in which a platform 11 supports three rotary cutters. A middle shaft 14 is journaled in the front portion of the platform along the center line thereof. The middle spindle 14 has at its upper edge and above the platform three pulleys. The uppermost pulley 16 is connected by a belt 20 to a drive pulley (not shown) on a tractor (not shown). The other two pulleys (not shown) are connected by belts to the outer drive spindles.

A pair of outer spindles 25, 26 are journaled in platform 11 at points rearwardly, outwardly and equidistant from the middle spindle 14. It will be seen that the configuration of these three spindles and the platform is that of an isosceles triangle symmetrically arranged with the middle spindle forward of the outer spindles. The upper ends of the outer spindles have affixed thereto pulleys which are connected through suitable belts 30, 31 to pulleys (not shown) on the middle spindle 14.

Each of the spindles 14, 25, 26, carries at the underside of said platform cutter blades 34, 35 and 36 respectively, which are all rotated in clockwise direction by the belt and pulley arrangement heretofore described. The blades have a concave middle portion with straight extremities and are rotated in a generally horizontal plane, as best shown in Figure 2.

Referring now to Figure 1, it will be seen that each cutter is mounted so as to overlap the path of the adjacent cutters. All the cutters are positioned in a manner to prevent contacting and damaging one another. By use of multiple cutters, so arranged, it is possible to cut a wide swath of grass.

Mounted forwardly of the leading edges of the platform is a pair of wheels 41, 42, each journaled to swivel or turn about a vertical axis, 43, 44, respectively. The wheels are mounted forwardly of the middle shaft spindle 14 and spaced apart at a distance less than the distance between the outer spindles 25, 26, and intermediate the outer shafts and the middle shaft. The wheels may be allowed to swivel freely, such as castors, or may be connected to a steering mechanism (not shown).

Mounted on each of the spindles is a deflector guard 50. Referring now to Figure 2, the rotating drive spindle 26 is supported relative to the lower platform 11 by a stationary housing or sleeve 45 containing bearings (not shown) in which the spindle can rotate. To the lower end portion of spindle 26 is attached a drive collar 46 for rotating the cutter blade 36. Between the drive collar 46 and cutter blade 36 is a centrifugal deflector guard 50 of imperforate sheet metal having a bottom wall 51 and a side wall. The deflector guard is fixed in position by a nut 52 pressing the bottom wall 51 between the drive collar 46 and the blade 36, so that the guard rotates with the spindle 26 and the blade 36.

The side wall of the deflector guard has a lower portion 53 spaced from and of a larger diameter than the stationary sleeve 45. It will be noted that the guard encloses the spindle from the top of the cutter blade 36 to a point below, and adjacent platform 11. The upper portion 54 of the deflector guard side wall is flared outwardly to a larger diameter than the lower portion 53 in a vertically arcuate configuration, so that it presents a dished or concave surface to the outer extremities of the cutter blade. The diameter of the guard increases as a non-linear function of its height. Deflector guard 50 may be hollow, with an open top. An aperture 56 may be disposed in the bottom of the deflector guard for draining any water that collects therein.

From the foregoing the operation of the device is believed to be apparent. The deflector guard rotates with the spindle and the cutter blade. By flinging or throwing the material outwardly via centrifugal forces, at the same time it prevents long grass, weeds, vines, string, wire, and the like from binding between the rotating spindle and the stationary platform. It does not interfere with the removal of clippings of the grass, and the like, from the cutter blade.

In the drawing and specification there has been set forth a preferred embodiment of the invention, and although specific terms are employed, these are used in a generic and descriptive sense only, and not for purposes of limitation. Changes in form and the proportion of parts, as well as the substitution of equivalents are contemplated, as circumstances may suggest or render expedient, without departing from the spirit or scope of this invention as further defined in the following claims.

I claim:

1. In a rotary power mower having a rotatable vertical spindle and a cutter blade mounted on said spindle, a deflector member fixedly mounted on said spindle adjacent to said cutter blade for preventing fouling by material winding around said spindle, said deflector member being flared outwardly and upwardly and having a concave surface in which the diameter increases as a non-linear function of the height.

2. A combination comprising a support member, a rotatable spindle journaled on said support member, a cutter blade mounted on one end portion of said spindle, means operatively associated with said spindle for rotating said spindle, and a deflector member fixedly mounted on said spindle adjacent to said cutter blades for preventing fouling by material winding around the spindle, said deflector having a first end portion larger than said spindle and a second end portion flared outwardly and upwardly to a larger diameter than said first end portion, said deflector member further having a concave surface in which the diameter gradually increases as a nonlinear function of the height.

3. The combination comprising a platform member, a rotatable vertical spindle journaled on said platform member, a cutter blade mounted at one end portion of said spindle, means operatively associated with said spindle for rotating said spindle, and a deflector fixedly mounted on said spindle adjacent to said cutter blade for preventing fouling by material winding around the spindle having a bottom portion larger than said spindle and a top portion flared outwardly and upwardly to a larger diameter than said bottom portion whereby said deflector member has an arcuate surface in which the diameter increases as a nonlinear function of the height.

4. In a rotary power mower, having a rotatable vertical spindle, a cutter blade mounted on the lower end portion of said spindle and means operatively associated with said spindle for rotating said spindle, a deflector member mounted on said spindle and adapted to rotate therewith, said deflector member being adjacent to said cutter blade for preventing fouling by material winding around said spindle, and said deflector member further having a concave surface in which the diameter increases as a nonlinear function of the height.

References Cited in the file of this patent

UNITED STATES PATENTS

| | | |
|---|---|---|
| 2,263,431 | White | Nov. 18, 1941 |
| 2,505,377 | Barker et al. | Apr. 25, 1950 |
| 2,539,619 | Goodall | Jan. 30, 1951 |
| 2,559,920 | Hainke | July 10, 1951 |
| 2,669,827 | Brownlee | Feb. 23, 1954 |
| 2,680,339 | Murphy | June 8, 1954 |
| 2,720,071 | Watanabe | Oct. 11, 1955 |
| 2,800,759 | Emmons | July 30, 1957 |